Patented Apr. 29, 1952

2,594,350

UNITED STATES PATENT OFFICE 2,594,350

BETA-DIETHYLAMINOETHYL 3-PHENYL-2-HYDROXYBENZOATE MANDELATE

Melville Sahyun, St. Johns, Mich.

No Drawing. Application December 21, 1950, Serial No. 202,126

2 Claims. (Cl. 260—473)

This invention relates to an acid addition salt of beta-diethylaminoethyl 3-phenyl-2-hydroxybenzoate. It is more particularly concerned with the mandelate salt of beta-diethylaminoethyl 3-phenyl-2-hydroxybenzoate.

It is an object of the present invention to prepare a compound combining anesthetic, mild antihistaminic, bactericidal and fungicidal properties. It is a further object of the present invention to prepare a bactericidal agent that is effective against bacterial infections in the urinary tract and bladder. Another object of the present invention is to produce a mandelate salt of beta-diethylaminoethyl 3-phenyl-2-hydroxybenzoate and a method for preparing the same.

Heretofore, mandelic acid (phenylglycolic acid) has been customarily used as an urinary antiseptic, but treatment with this acid is frequently accompanied by severe irritation and other toxic effects upon the mucosa tissues. It has been very difficult to destroy microorganisms of the staphylococcus-splitting varieties frequently found in the urinary tract and bladder. Unsuccessful attempts to control these organisms have been made with streptomycin and penicillin.

I have now found that the free base, beta-diethylaminoethyl 3-phenyl-2-hydroxybenzoate, can be reacted with mandelic acid to produce a mandelate ester salt that exhibits unusual fungicidal and bactericidal properties not possessed by the mandelic acid itself. The mandelate salt is produced as an oil that is very soluble in any aqueous dilution.

The following example is given to illustrate the practice of the present invention but is in no way to be construed as limiting.

Example

One mole of beta-diethylaminoethyl 3-phenyl-2-hydroxybenzoate hydrochloride was dissolved in water. The pH of the aqueous solution was adjusted to approximately 7.0 with aqueous sodium hydroxide. The free beta-diethylaminoethyl 3-phenyl-2-hydroxybenzoate was extracted from the aqueous solution with ether. The ether extract was dried and the free base was distilled. The free base was then mixed with an equimolecular proportion of the free mandelic acid. There was obtained an oily liquid soluble in all dilutions in water.

When prepared according to the method of Example 1, my novel compound possesses mild antihistaminic, fungicidal, local anesthetic, and bactericidal properties, the bactericidal activity being much superior to that possessed by the mandelic acid alone. For example, an aqueous or sterile isotonic solution containing .14 percent beta-diethylaminoethyl 3 - phenyl-2-hydroxybenzoate mandelate is very useful as a urinary antiseptic and germicide. An aqueous or sterile isotonic solution containing .28 percent beta-diethylaminoethyl 3-phenyl-2-hydroxybenzoate mandeate is a very effective bactericidal agent for microorganisms found in the bladder, such as *E. coli, S. viridins, S. aureus, B. subtilis,* and certain urea splitting staphylococcus.

It is preferred, when utilizing the compound of the present invention in a therapeutic composition, to stabilize the solution with an amount of 0.1 percent sodium bisulfite equal to approximately seven percent of the beta-diethylaminoethyl 3-phenyl-2-hydroxybenzoate mandelate present.

Various modifications may be made in the present invention without departing from the spirit or scope thereof and it is to be understood that I limit myself only as defined in the appended claims.

I claim:

1. Beta-diethylaminoethyl 3 - phenyl - 2 - hydroxybenzoate mandelate.

2. The process which includes: mixing substantially equimolecular proportions of mandelic acid with beta-diethylaminoethyl 3-phenyl-2-hydroxybenzoate; and, recovering beta-diethylaminoethyl 3-phenyl-2-hydroxybenzoate mandelate from the reaction product.

MELVILLE SAHYUN.

No references cited.